United States Patent [19]

LaSpisa et al.

[11] 4,250,130
[45] Feb. 10, 1981

[54] CONTROL OF PIPE TENSION BETWEEN EXTRUDER DIE AND TAKE-UP COILER

[75] Inventors: Ronald J. LaSpisa, Bartlesville; Arthur H. McElroy, Tulsa, both of Okla.

[73] Assignee: Phillips Petroleum Company, Bartlesville, Okla.

[21] Appl. No.: 941,694

[22] Filed: Sep. 12, 1978

Related U.S. Application Data

[62] Division of Ser. No. 762,550, Jan. 25, 1977, Pat. No. 4,124,340.

[51] Int. Cl.³ .............................................. B29D 23/00
[52] U.S. Cl. ................................. 264/40.7; 264/209.1
[58] Field of Search ................. 264/209, 210 R, 40.7, 264/236; 425/135, 136, 377; 242/55, 67.1, 75.51; 318/6

[56] References Cited

U.S. PATENT DOCUMENTS

| | | | |
|---|---|---|---|
| 1,740,029 | 12/1929 | Moomy | 264/209 |
| 2,630,277 | 3/1953 | Haller | 242/55 |
| 2,877,397 | 3/1959 | Poschner et al. | 318/6 |
| 3,198,868 | 8/1965 | Pedretti et al. | 264/236 |
| 3,370,802 | 2/1968 | Wooldridge et al. | 242/55.12 |
| 3,636,149 | 1/1972 | Tambini | 264/40.7 |
| 3,687,389 | 8/1972 | Adams | 242/75.51 |
| 3,787,552 | 1/1974 | Spencer et al. | 264/236 |
| 3,827,844 | 8/1974 | Frey et al. | 425/377 |
| 3,890,547 | 6/1975 | Keck | 318/6 |
| 3,956,442 | 5/1976 | Boulain | 264/236 |

FOREIGN PATENT DOCUMENTS

721211  11/1965  Canada ................................. 264/40.7

*Primary Examiner*—Jay H. Woo

[57] ABSTRACT

A process and apparatus for minimizing breakage and stretching during the high speed production of plastic pipe is provided wherein a pipe is extruded at a first linear rate of speed, a slack segment is established and maintained between the extruder and a pipe winder, and the pipe is taken up on the winder at a second linear rate of speed which is the same as or different from the first rate, wherein the pipe is taken up on the winder responsive to the degree of slack in the slack segment.

6 Claims, 5 Drawing Figures

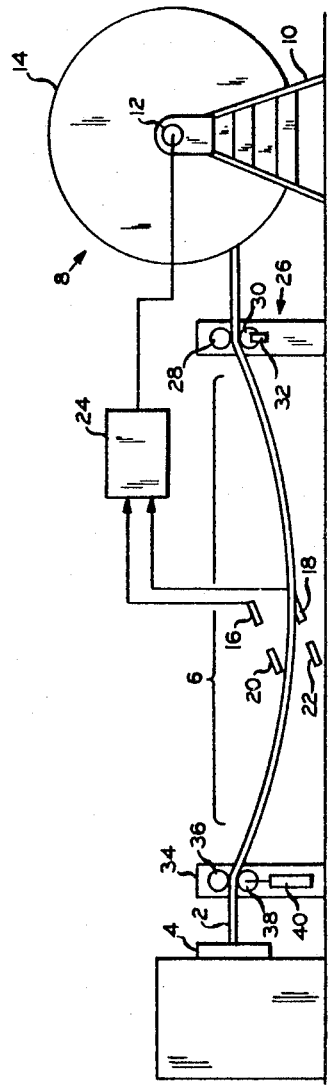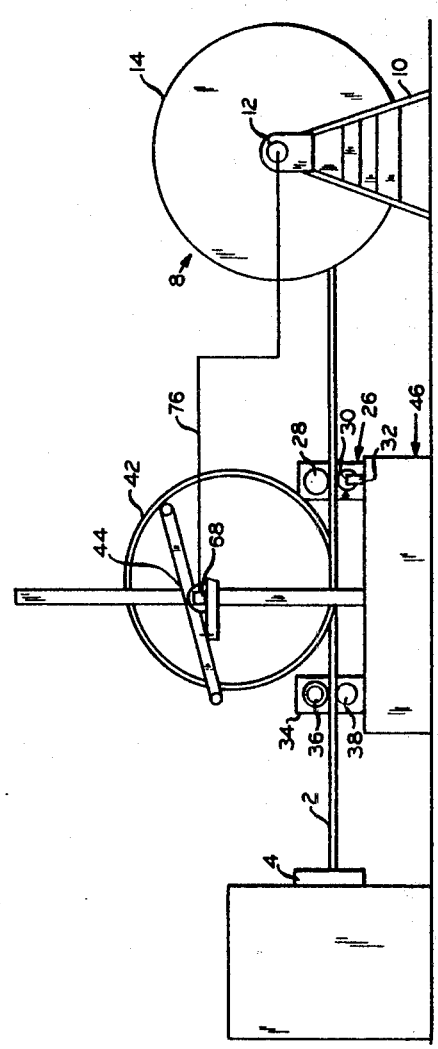

CONTROL OF PIPE TENSION BETWEEN EXTRUDER DIE AND TAKE-UP COILER

This application is a divisional application of copending application Ser. No. 762,550, filed Jan. 25, 1977, now U.S. Pat. No. 4,124,340.

This invention relates to the extrusion of plastic pipe. In one aspect, this invention relates to a method for minimizing breakage and stretching of plastic pipe during its production. In another aspect, this invention relates to an apparatus for extruding a plastic pipe and for winding the pipe onto a winding roll while controlling tension on the pipe.

Recent advances in extrusion technology have made it possible to extrude small diameter plastic pipe at relatively high rates. For example, it is now possible to extrude pipe having a diameter between $\frac{1}{2}"$ and $1\frac{1}{8}"$ at a rate of up to approximately 180 inches per minute. This high extrusion rate has, however, created problems of breakage and stretching of the pipe, due in large part to failure of the pipe take-up coiler to respond to changes in the extrusion rate. It is, therefore, desirable to be able to extrude a small diameter plastic pipe and wind same onto a take-up roll wherein isolation is provided between the extruder and the take-up roll, whereby breakage and stretching are minimized, if not completely eliminated.

It is an object of the present invention to provide an improved process for extruding small diameter plastic pipe and for winding same onto a take-up roll.

It is another object of the present invention to provide an improved apparatus for extruding small diameter plastic pipe and for winding same onto a take-up roll.

It is a further object of this invention to provide an apparatus for isolating the tension in an extruded plastic pipe between the extruder and a take-up roll.

Other objects, aspects and advantages of the present invention will be readily apparent to those skilled in the art from the reading of the following disclosure, appended claims and attached drawings.

It has now been found that breakage and stretching of plastic pipe can be minimized, if not eliminated, by isolating the pipe extruder means from the winding means. Thus, tension in the pipe created by the winding means is not transmitted through the pipe to the extruder means.

Isolation between the extruder means and the winding means is provided by a slack segment. The degree of slack in the slack segment is measured by sensing means and the take-up speed of the winding means is varied responsive thereto.

More particularly, the present invention provides an improved process for minimizing breakage and stretching of plastic pipe during the production of same which comprises:

(a) extruding a plastic pipe from an extruder means at a first linear rate of speed;
(b) establishing and maintaining a slack segment in the pipe between the extruder means and a winding means, thereby isolating the winding means from the extruded means; and
(c) taking up the pipe onto a winding means at a second linear rate of speed which is the same as or different from the first rate, wherein the pipe is taken up onto the winding means responsive to the degree of slack in the slack segment.

In one embodiment of this invention, the slack segment is established by allowing the pipe to arc between the extruder means and the winding means. The length of the arc, measured along the plastic pipe, should generally be at least about 1.02 times the straight line distance between the two points of suspension, i.e., the extruder means and the winding means. The maximum length of the arc is, of course, determined by the height of the suspension points above the floor under the lowest point of the arc.

In another embodiment of this invention, the slack segment is established by forming the pipe into a closed loop between the extruder means and the winding means. The closed loop can be any convenient size, so long as the pipe is not kinked in its minimum loop configuration. In general the loop should have a minimum inside diameter of at least about 40 inches, preferably at least about 48 inches. The maximum size of the closed loop is determined by the means for maintaining the pipe in a closed loop. In general, the maximum inside diameter is about 10 feet, or greater, depending upon the physical size of the loop maintaining means.

The process and apparatus of the present invention will be better understood by reference to the accompanying drawings, of which FIG. 1 is a side view of an apparatus for extruding and winding a plastic pipe wherein the pipe winder is isolated from the extruder by a slack segment of pipe.

FIG. 2 is a side view of an apparatus for extruding and winding a plastic pipe, wherein isolation between the extruder and the pipe winder is provided by a closed loop.

Figure 3:
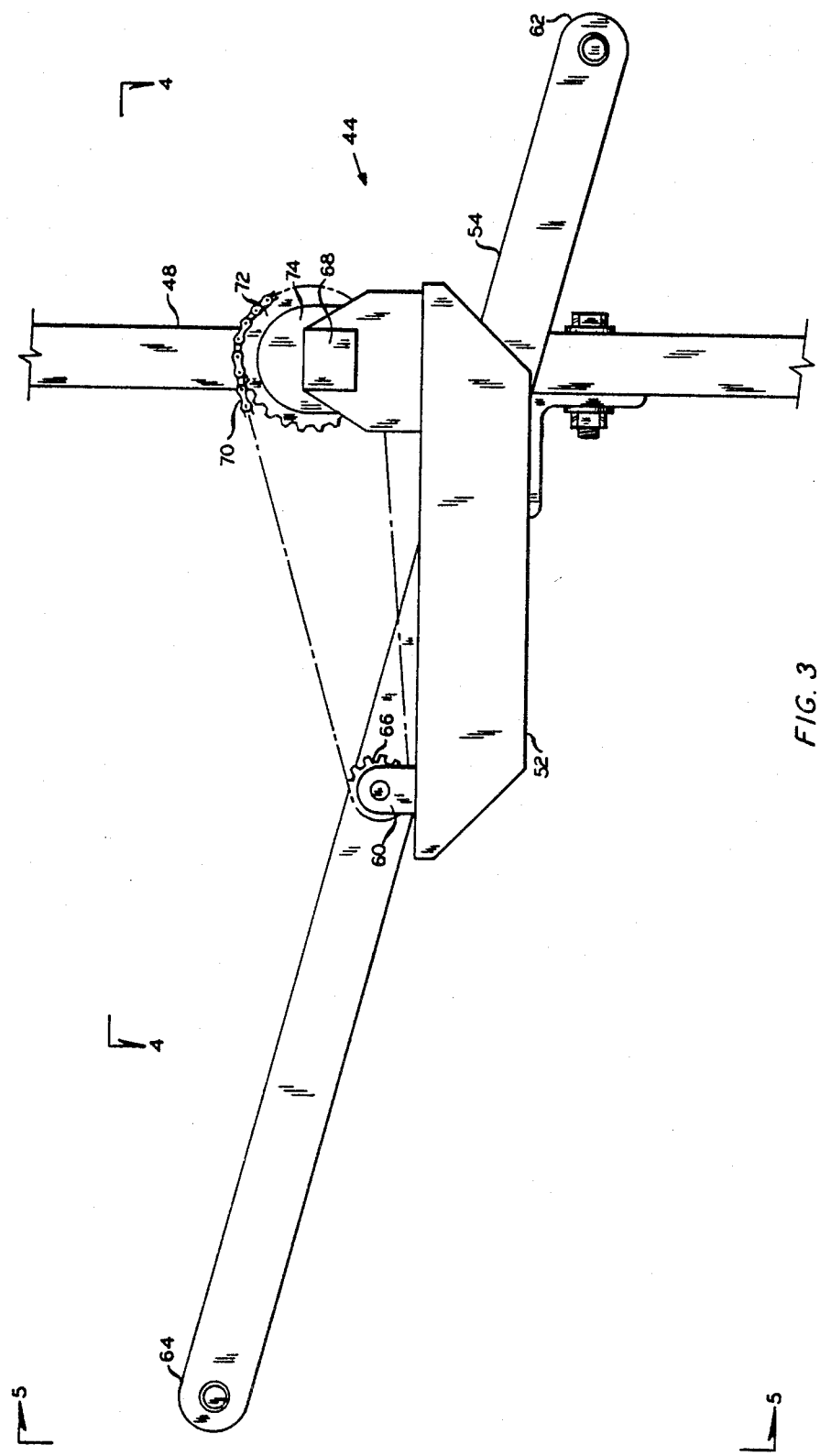
FIG. 3 is a side view of the loop size sensing means employed in the apparatus of FIG. 2.

Referring now to FIG. 1, a plastic pipe 2 is shown as it emerges from extruder die 4. A slack segment is formed in the pipe 2, as at 6, and the pipe is taken up by winding means 8.

The winding means 8 has a frame means 10 for mounting and a motor means 12 adapted to effect rotation of winding roll 14 whereby the pipe is wound onto winding roll 14.

The motor means 12 can be electric, hydraulic or pneumatic. The speed of motor means 12 is controlled by appropriate electrical control means, hydraulic control means or pneumatic control means, respectively, as hereinafter discussed.

The pipe 2 can be extruded by any suitable extruder, such as a screw-, ram-, or dynamic-type extruder such as, for example, the type disclosed in U.S. Pat. No. 3,387,073, which is incorporated herein by reference.

It is important that the slack segment 6 be present in a controlled magnitude; therefore, the upper and lower limits of segment 6 are monitored by any suitable means, such as, for example, photo-responsive cells, 16 and 18, respectively, or the like. In FIG. 1, the upper limit of the slack segment 6 is sensed by photo-responsive cell 16 positioned opposite light source 20, while the lower limit of the segment is controlled by photo-responsive cell 18, positioned opposite light source 22. It is understood, of course, that the photo-responsive cells and sources are positioned so as to detect the upper and lower limits of the slack segment.

The outputs of the cells 16 and 18 are coupled to the power source 24 for motor means 12. In this fashion if slack segment 6 becomes too large, motor means 12 is caused to run faster to take up the unwanted portion of slack. Conversely, if the slack segment becomes too small, motor means 12 is caused to run slower to allow the slack segment to become larger.

In one embodiment of this invention, the pipe 2 is passed through a constant tensioning means 26 positioned just ahead of the winding means 8 in order to maintain the pipe under appropriate tension for proper coiling on the winding roll 14. The constant tensioning means 26 can be a drag-pinch-roller arrangement comprising an idler roller 28 and a braked roller 30 having in association therewith an adjustable braking means 32. The rollers 28 and 30 have profiles to fit the outer contour of the pipe 2. The desired winding tension on the pipe is achieved by varying the braking force applied to the wheel 30 by braking means 32.

In another embodiment of this invention, a pipe pulling means 34 is employed after the die 4 and ahead of the slack segment 6 to increase the extrusion rate by pulling the pipe 2 with a constant force from the die. The pulling means 34 comprises an idler roller 36 and a driven roller 38 which is driven at a preset speed by a motor means 40.

FIG. 2 illustrates an alternative embodiment of this invention wherein isolation between the die 4 and the take-up roll means 8 is provided by a closed loop 42. In this embodiment, the loop sensing means 44, the pipe pulling means 34 and the constant tensioning means 26 are mounted on a base 46. The loop sensing means 44 is shown in greater detail in FIGS. 3-5.

Figure 4:
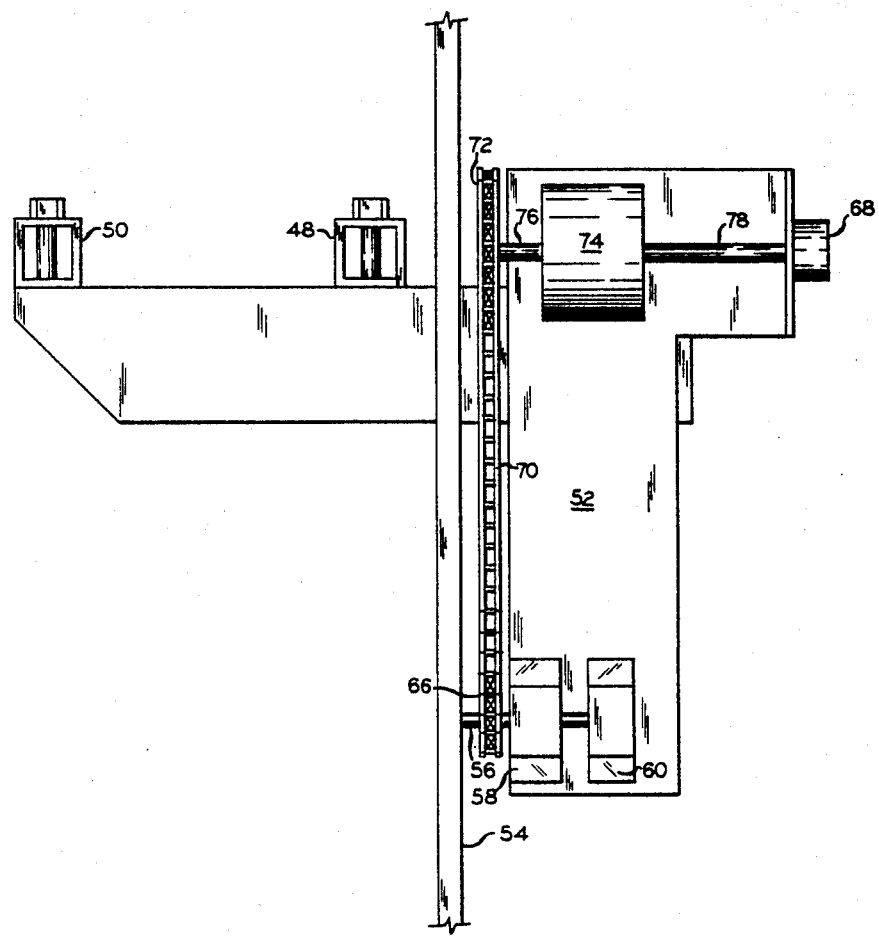
FIGS. 4 and 5 are top and end views of the apparatus illustrated in FIG. 3, taken at 4—4 and 5—5, respectively, of FIG. 3.
Figure 5:
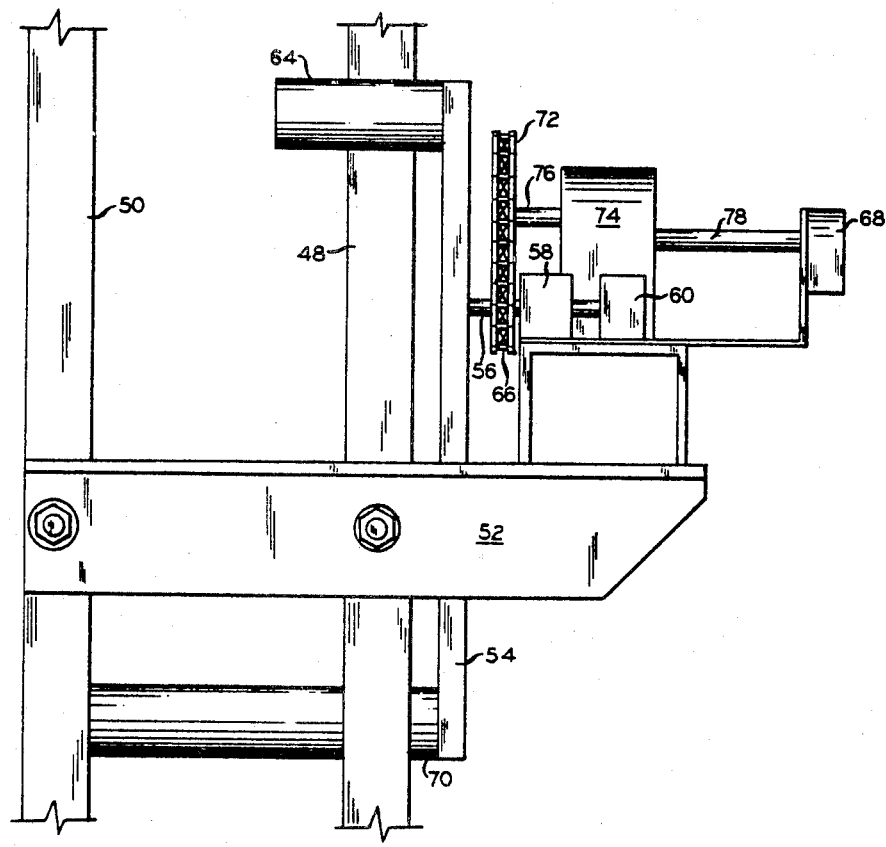

As shown in FIGS. 3, 4 and 5, the loop sensing means 44 is adjustably supported on the base 46 by vertical support means 48 and 50. The loop sensing means comprises a mounting base assembly 52 adjustably mounted to the vertical support means 48 and 50, and a pivotally mounted sensing arm 54. Arm 54 is fastened or secured to shaft 56, shaft 56 being, in turn, journaled for arcuate rotation by means of bearings 58 and 60 which are attached to base assembly 52.

One end of the sensing arm 54 has a contacting roller 62 for contacting the pipe loop. The contacting roller 62 can be journaled for rotation by suitable bearings, not shown. The opposite end of the sensing arm 54 has a counterweight 64 of sufficient weight to generally impart an overall counterclockwise movement to the sensing arm 54. A drive sprocket 66 is secured to shaft 56 between the sensing arm 54 and bearing 58.

Signals generated by movement of the sensing arm 54 are transmitted to motor controlling means 68 through drive sprocket 66, drive chain 70, driven sprocket 72, and speed reducing means 74, the driven sprocket 72 being attached to the input shaft 76 of speed reducing means 74 and motor controlling means 68 being attached to the output shaft 78 of speed reducing means 74.

Motor means 12 can be electric, hydraulic or pneumatic, and motor controlling means 68 can be a rheostat or potentiometer, hydraulic valve or pneumatic valve, respectively. By coupling the sensing arm 54 through the sprockets 66 and 72, drive chain 70 and speed reducing means 74 to the motor controling means 68, in the manner illustrated, minor fluctuations in the size of the loop segment 42 are minimized, thus reducing fluctuation in the speed of motor means 12.

Referring again to FIG. 2, power, either electrical, hydraulic, or pneumatic, is supplied to motor control means 68, from a source not shown. Controlled power is then transmitted to motor means 12 via line 76. Thus, if the slack loop 42 becomes too large, the contacting roller end of sensing arm 54 moves upwardly. This upward motion is translated to rotary motion and transmitted to motor control means 68 through drive sprocket 66, drive chain 70, driven sprocket 72 and speed reducing means 74. The motor controlling means then acts to increase the speed of motor means 12, either by increasing voltage, hydraulic flow or pneumatic flow, depending upon the type motor and motor controller used. Conversely, if the slack loop becomes too small, the contacting roller end of sensing arm 54 moves downwardly, thereby causing motor drive means 12 to run slower to allow the slack loop 42 to become larger.

The apparatus of this invention is particularly suitable for the high speed extrusion and take-up of small diameter, flexible thermoplastic pipe, such as polyethylene pipe. By small diameter pipe it is meant pipe having an outer diameter of up to about 3 inches. By high speed, it is meant an extrusion rate of up to about 200 inches per minute or greater, generally from 50 to 180 inches per minute. For example, a 1-inch pipe can be extruded at speeds up to about 200 inches per minute and 3-inch pipe can be extruded at a rate of about 50 inches per minute.

Reasonable variations and modifications, which will be apparent to those skilled in the art, can be made in this invention without departing from the spirit and scope thereof.

We claim:

1. A process for minimizing breakage and stretching of plastic pipe during production of same which comprises:
    (a) extruding said pipe at a first linear rate of speed from an extruder means;
    (b) establishing and maintaining a slack segment in said pipe between said extruder means and a winding means, thereby isolating said winding means from said extruder means;
    (c) establishing and maintaining a tension segment in said pipe between said slack segment and said winding means;
    (d) taking up said pipe onto said winding means from said tension segment at a second linear rate of speed which is the same as or different from said first rate; wherein said pipe is taken up onto said winding means responsive to the degree of slack in said slack segment.

2. The process of claim 1 wherein said slack segment has an arc shape and the degree of slack is measured by at least two sensor means, the first of said sensor means being positioned so as to sense the minimum slack in said segment, and the second of said sensor means being positioned so as to sense the maximum slack in said segment, wherein said first sensor means provides a signal to said winding means whereby said second linear rate of speed is decreased responsive thereto, and wherein said second sensor means provides a signal to said winding means whereby said second linear rate of speed is increased responsive thereto.

3. The process of claim 2 wherein the length of said slack segment is at least about 1.02 times the straight line distance between said extruder means and said winding means.

4. The process of claim 2 wherein said sensor means are photoresponsive cells.

5. The process of claim 1 wherein said first linear rate of speed is in the approximate range of 50 to 200 inches per minute or greater.

6. The process of claim 1 wherein said slack segment is a closed loop and wherein the degree of slack is measured by at least one sensor means which senses the immediate inside diameter of said loop, wherein said sensor means provides a signal to said winding means whereby said second linear rate of speed is controlled responsive thereto.

* * * * *